(12) United States Patent
Suzuki et al.

(10) Patent No.: US 10,961,417 B2
(45) Date of Patent: Mar. 30, 2021

(54) LAMINATE SHEET AND ROLL (71) Applicant: NITTO DENKO CORPORATION, Ibaraki (JP)

(72) Inventors: Tatsuya Suzuki, Ibaraki (JP); Akira Hirao, Ibaraki (JP); Hiroki Ieda, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/255,378

(22) Filed: Jan. 23, 2019

(65) Prior Publication Data
US 2019/0225838 A1 Jul. 25, 2019

(30) Foreign Application Priority Data
Jan. 24, 2018 (JP) .............. JP2018-009646

(51) Int. Cl.
C09J 7/25 (2018.01)
C09J 7/40 (2018.01)
C09J 7/38 (2018.01)
B32B 7/06 (2019.01)
B32B 7/12 (2006.01)
B32B 27/26 (2006.01)
C09J 7/22 (2018.01)
(Continued)

(52) U.S. Cl.
CPC .............. C09J 7/255 (2018.01); B32B 7/06 (2013.01); B32B 7/12 (2013.01); B32B 27/32 (2013.01); B32B 27/36 (2013.01); C09J 7/22 (2018.01); C09J 7/38 (2018.01); C09J 7/385 (2018.01); C09J 7/401 (2018.01); B32B 2405/00 (2013.01); C09J 2301/312 (2020.08); C09J 2423/045 (2013.01); C09J 2423/105 (2013.01); C09J 2433/00 (2013.01); C09J 2467/005 (2013.01); C09J 2467/006 (2013.01); Y10T 428/14 (2015.01)

(58) Field of Classification Search
CPC ..... C09J 7/255; C09J 7/385; C09J 7/22; C09J 7/401; C09J 7/38; C09J 2201/622; C09J 2423/045; C09J 2423/105; C09J 2433/00; C09J 2467/005; C09J 2467/006; B32B 7/06; B32B 27/32; B32B 37/36; B32B 2405/00; Y10T 428/14
See application file for complete search history.

(56) References Cited

U.S. PATENT DOCUMENTS

2010/0119803 A1 5/2010 Kosaka et al.
2014/0367883 A1 12/2014 Hatakeyama et al.
2015/0090922 A1 4/2015 Hatakeyama et al.

FOREIGN PATENT DOCUMENTS

EP 1 520 896 A1 4/2005
JP 07-324182 A 12/1995
JP 2013-176980 A 9/2013

OTHER PUBLICATIONS

Extended European Search Report dated Jun. 18, 2019, issued by the European patent Office in corresponding Application No. 19153021.1.

Primary Examiner — Patricia L. Nordmeyer
(74) Attorney, Agent, or Firm — Sughrue Mion, PLLC (57) ABSTRACT

Provided is a laminate sheet in which a first sheet, a PSA layer and a second sheet are laminated in this order. Of the first and second sheets, at least one is a release liner having a release face on the side facing the PSA layer. The PSA layer has a thickness of 200 μm or greater. The first sheet has a tensile modulus of 1000 MPa or greater and the second sheet has a tensile modulus of 500 MPa or less.

6 Claims, 2 Drawing Sheets (51) Int. Cl.
    *B32B 27/36*           (2006.01)
    *B32B 27/32*           (2006.01)

LAMINATE SHEET AND ROLL

CROSS-REFERENCE

The present application claims priority to Japanese Patent Application No. 2018-9646 filed on Jan. 24, 2018; the entire content thereof is incorporated herein by reference.

BACKGROUND OF THE INVENTION

Field of the Invention

The present invention relates to a laminate sheet comprising a pressure-sensitive adhesive layer and a roll comprising the laminate sheet in a wound form.

Description of the Related Art

Pressure-sensitive adhesive (PSA) has been widely used in various industrial fields such as home appliance, automobiles and OA equipment, for instance, as a substrate-supported PSA sheet having a PSA layer on a support substrate or as a substrate-free PSA sheet with no support substrate. When the adherend has an uneven surface, it is preferable that the PSA sheet conforms to the surface contours to form tight adhesion. For instance, with greater contour-conformability of the PSA layer forming a thermally conductive PSA sheet, the heat transfer between the contoured adherend and the PSA layer can be improved. Technical documents related to thermally conductive PSA sheets include Japanese Patent Application Publication No. 2013-176980.

SUMMARY OF THE INVENTION

In general, with increasing thickness of a PSA layer, the contour-conformability tends to increase. In particular, in a PSA sheet having a substrate, increasing the PSA layer's thickness can be an effective means of increasing the contour-conformability of the PSA layer with reducing the influence of the substrate's rigidity.

Figure 4:
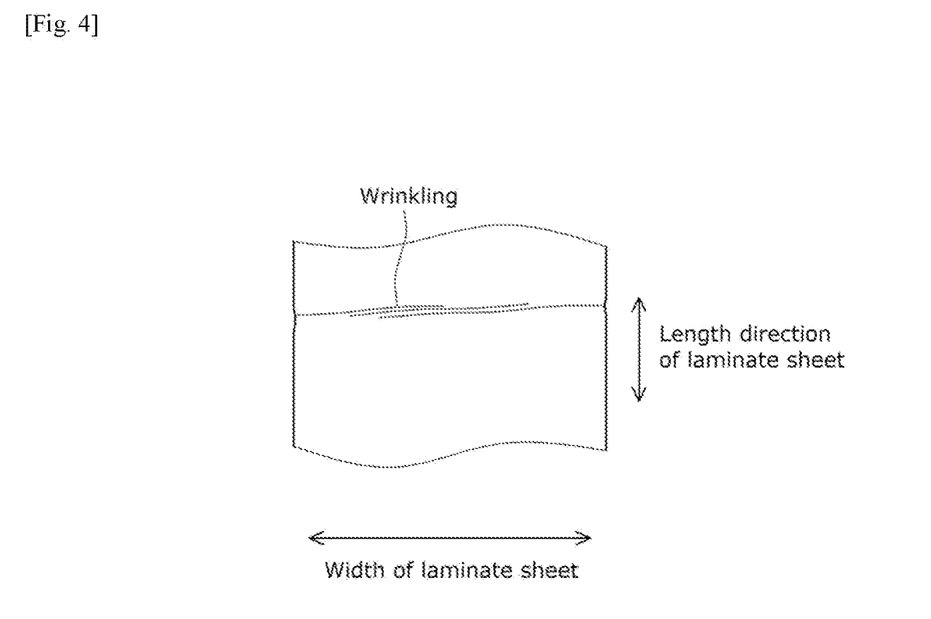
FIG. 4 shows a schematic top view of the laminate sheet with wrinkling.

On the other hand, from the standpoint of the productivity, handleability, convenience of storage and transport, etc., it is desired that the PSA sheet can be wound in a roll. Prior to use (i.e. before applied to an adherend), the PSA sheet can be present as a laminate sheet in which a release liner is laminated to protect the adhesive face (the surface of the PSA layer) of the PSA sheet. With respect to a laminate sheet in such an embodiment, however, when the PSA layer is thick, winding the laminate sheet to form a roll may cause wrinkling (or crease) on its inside surface. Presumably, this occurs because, when a laminate sheet having a thick PSA layer is wound, the difference in length between the inside and the outside of the wound sheet causes locally-concentrated strain, thereby resulting in partial deformation in the laminate sheet. In particular, a laminate sheet having a highly rigid sheet such as polyethylene terephthalate film is susceptible to wrinkling. Once wrinkling occurs in a laminate sheet, even if the roll is unwound, the influence of the wrinkling remains (see FIG. 4) and because that particular portion of the PSA layer forms adhesion not as tight as originally designed, it can be no longer used as a PSA sheet. Accordingly, it is beneficial to prevent the occurrence of wrinkling from the standpoint of increasing the yield.

The present invention has been made in view of such circumstances with an objective to provide a laminate sheet that has a thick PSA layer and is also unsusceptible to wrinkling when wound. Another related objective is to provide a roll formed by winding the laminate sheet.

This description provides a laminate sheet in which a first sheet, a PSA layer and a second sheet are laminated in this order. Between the first and second sheets, at least one is a release liner having a release face on the side facing the PSA layer. The PSA layer has a thickness of 200 μm or greater. The first sheet has a tensile modulus of 1000 MPa or greater and the second sheet has a tensile modulus of 500 MPa or less. Having such a structure, despite of having the thick PSA layer and the highly rigid first sheet, the resulting laminate sheet can be unsusceptible to wrinkling even in a roll form. Such a laminate sheet is preferable because it may be manufactured with high efficiency and may have great handling properties as well as excellent contour-conformability.

The laminate sheet disclosed herein can be preferably made in an embodiment where the PSA layer has a storage modulus at 23° C. (or simply a "storage modulus" hereinafter) of 0.1 MPa or greater. An increase in storage modulus of the PSA layer tends to result in lower stress relaxation within the PSA layer, likely causing wrinkling. Thus, it is particularly significant to apply the art disclosed herein to inhibit the occurrence of wrinkling.

In some embodiments, the first sheet can be selected from the group consisting of polyethylene terephthalate film, polyethylene naphthalate film and polyimide film. According to the art disclosed herein, it is possible to obtain a laminate sheet unsusceptible to wrinkling even when wound in a roll, despite of comprising a first sheet formed of such a material and also having a thick PSA layer.

In some embodiments, the second sheet may be a polyolefin film. The art disclosed herein can be preferably implemented in an embodiment comprising a second sheet formed of such a material.

The laminate sheet disclosed herein can be preferably made in an embodiment where the PSA layer comprises a filler. A laminate sheet having a filler-containing PSA layer tends to be susceptible to wrinkling because the PSA layer is likely to have a high storage modulus, etc. It is particularly significant to apply the art disclosed herein to inhibit the occurrence of wrinkling.

The laminate sheet disclosed herein can be preferably made in an embodiment where, between the first and second sheets, one is the release liner and the other is a support substrate to which the PSA layer is bonded. The laminate sheet in this embodiment tends to show low stress relaxation within the PSA layer because the substrate support-facing side (backside) of the PSA layer is fixed to the support substrate. This is disadvantageous in view of preventing the occurrence of wrinkling. Thus, it is particularly meaningful to apply the art disclosed herein to inhibit the occurrence of wrinkling.

The laminate sheet disclosed herein has a thick PSA layer; and therefore, it may be excellent in conformability to contours on the adherend surface and bring about efficient heat transfer between the adherend and the PSA layer. For such characteristics, the PSA layer in the laminate sheet can be preferably used as, for instance, a thermally conductive PSA sheet, by itself or in a form of substrate-supported PSA sheet. Thus, the art disclosed herein can be preferably implemented in a form of laminate sheet comprising a thermally conductive PSA sheet and a release liner protecting the adhesive face of the thermally conductive PSA sheet.

Despite of having a thick PSA layer, the laminate sheet disclosed herein is unsusceptible to wrinkling even when wound in a roll. Thus, in another aspect, the present description provides a roll comprising any of a laminate sheet disclosed herein in a wound form.

In some embodiments of the roll disclosed herein, the laminate sheet roll may have an inner diameter of 100 mm or smaller. The art disclosed herein can provide a roll for which the occurrence of wrinkling is effectively inhibited even with such a relatively small inner diameter of roll. The inner diameter of the roll refers to the diameter of the innermost circle formed by the wound laminate sheet. In a roll of the laminate sheet wound around a core (roll core), the outer diameter (diameter of the outer surface) of the core can be considered as the inner diameter of the laminate sheet roll.

In the roll disclosed herein, the laminate sheet is preferably wound so that the first sheet is on the inside (inner circumferential side). In the roll in such an embodiment, the occurrence of wrinkling can be better inhibited.

The combinations of the elements described hereinabove may be encompassed by the scope of the invention for which the protection by patent is sought by the present application.

DESCRIPTION OF EMBODIMENTS

Preferable embodiments of the present invention are described below. Matters necessary to practice this invention other than those specifically referred to in this description can be understood by a person skilled in the art based on the disclosure about implementing the invention in this description and common technical knowledge at the time the application was filed. The present invention can be practiced based on the contents disclosed in this description and common technical knowledge in the subject field.

In the following drawings, components or units having the same functions may be described with the same symbols allocated and the redundant description may be omitted or simplified. The embodiments illustrated in the drawings are schematic in order to clearly describe the present invention and the drawings do not accurately represent the size or scale of products actually provided.

<Example of Structure of Laminate Sheet>

Figure 1:
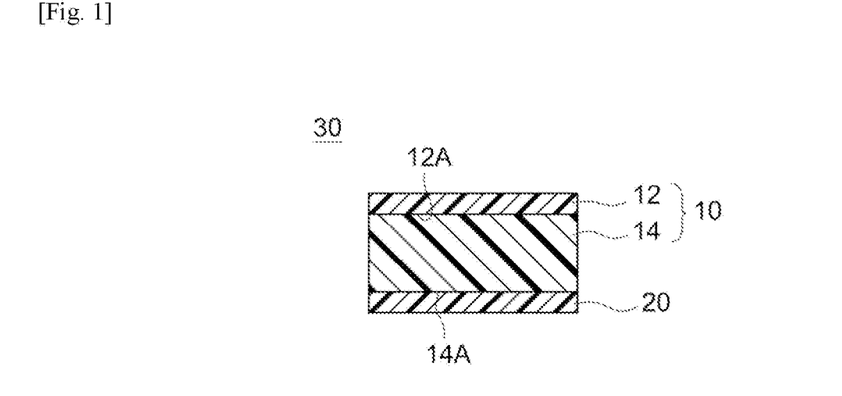
FIG. 1 shows a cross-sectional diagram schematically illustrating the laminate sheet according to an embodiment.

FIG. 1 shows the structure of the laminate sheet according to an embodiment. A laminate sheet 30 has a structure in which a support substrate 12, a PSA layer 14 having a thickness of at least 200 μm, and a release liner 20 are laminated in this order. Here, support substrate 12 is the first sheet having a tensile modulus of 1000 MPa or greater and release liner 20 is the second sheet having a tensile modulus of 500 MPa or less. Conversely, the support substrate can be the second sheet and the release liner can be the first sheet. PSA layer 14 is provided, bonded to the first face 12A of support substrate 12 while PSA layer 14 is not supposed to be separated from support substrate 12. This unites support substrate 12 and PSA layer 14 to form a PSA sheet (substrate-supported single-faced PSA sheet) 10. The surface (adhesive face) 14A of PSA layer 14 is protected with release liner 20 having a release face at least on the side facing PSA layer 14. Laminate sheet 30 having such a structure can be considered as a laminate of PSA sheet 10 and release liner 20 protecting adhesive face 14A of PSA sheet 10. When laminate sheet 30 is used, release liner 20 is removed from PSA sheet 10 and the exposed adhesive face 14A is adhered to an adherend.

Figure 2:
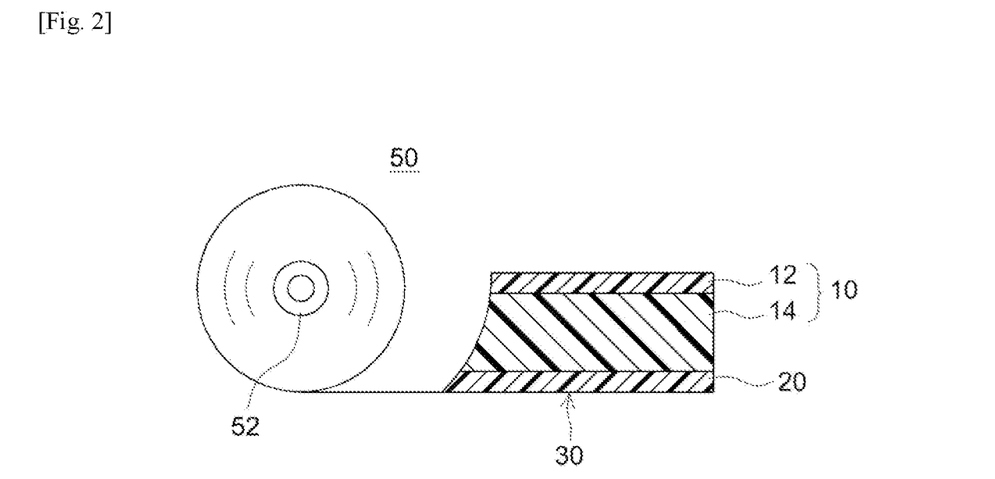
FIG. 2 shows a partial cross-sectional diagram schematically illustrating an example of the roll formed by winding the laminate sheet according to an embodiment.

For instance, as shown in FIG. 2, laminate sheet 30 prior to use may have a form of roll 50 in which it is wound around a core (roll core) 52. It may be in a form of roll free of core 52, that is, in a form of so-called coreless roll in which laminate sheet 30 is wound by itself.

Figure 3:
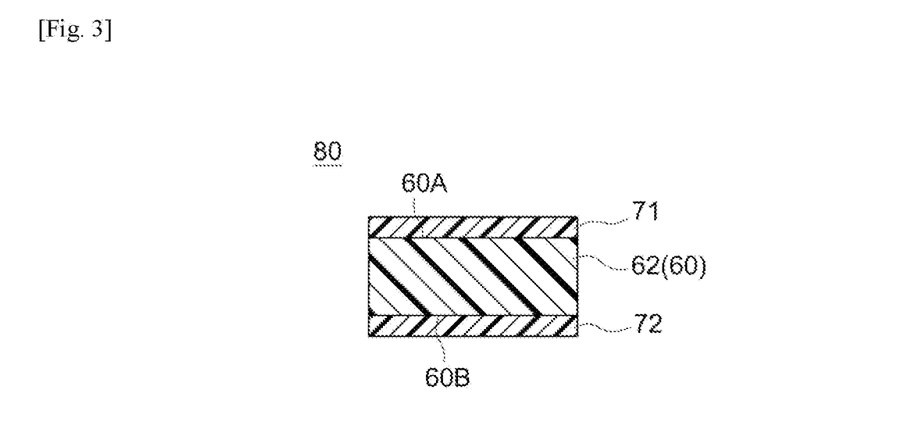
FIG. 3 shows a cross-sectional diagram schematically illustrating the laminate sheet according to another embodiment.

FIG. 3 schematically illustrates the structure of the laminate sheet according to another embodiment. A laminate sheet 80 has a structure in which a first release liner 71, a PSA layer 62 having a thickness of at least 200 μm, and a second release liner 72 are laminated in this order. Here, the first release liner 71 is the first sheet having a tensile modulus of 1000 MPa or greater and the second release liner 72 is the second sheet having a tensile modulus of 500 MPa or less. The first and second release liners 71 and 72 individually have a release face at least on the side facing PSA layer 62. Laminate sheet 80 having such a structure can be considered as a laminate of PSA sheet (substrate-free PSA sheet) 60 formed of PSA layer 62 and release liners 71 and 72 protecting two surfaces (first and second adhesive faces) 60A and 60B of PSA sheet 60. When laminate sheet 80 is used, release liners 71 and 72 are removed from PSA sheet 60 and the exposed adhesive faces 60A and 60B are adhered to adherends. Laminate sheet 80 prior to use may have a form of roll in which it is wound around a core with the first release liner 71 on the inside. Alternatively, it may have a form of roll in which it is wound around a core with the second release liner 72 on the inside. It may have a coreless roll form as well.

<First and Second Sheets>

The laminate sheet disclosed herein comprises a first sheet having a tensile modulus of 1000 MPa or greater and a second sheet having a tensile modulus of 500 MPa or less, having a structure in which a PSA layer having a thickness of 200 μm or greater is placed between the first and second sheets. According to the laminate sheet comprising the first and second sheets having such tensile moduli together, even when the PSA layer is as thick as or thicker than 200 μm, wrinkling can be effectively inhibited. Because the laminate sheet includes the first sheet having a high tensile modulus, it has excellent strength and size stability. This can be advantageous from the standpoint of increasing the productivity of the laminate sheet and the ease of processing.

The tensile moduli of the first and second sheets are determined by the following method.

[Determination of Tensile Modulus]

A 10 mm wide strip of measurement sample is obtained. The measurement sample is set at an inter-chuck distance of 50 mm in a tensile tester. At room temperature (23° C.), at a tensile speed of 50 mm/min, a tensile test is conducted to obtain a stress-strain curve. The tensile modulus is determined from the slope of the stress-strain curve between 0% and 5% distortion. As the tensile tester, precision universal tensile tester autograph AG-IS (available from Shimadzu Corporation) or a comparable product can be used. The measurement sample is desirably prepared so that the length direction (MD) of the laminate sheet is in the tensile direction of the sample in the tensile test. The tensile moduli of the release liners and support substrate used in the working examples described later were determined by the above-described method.

In some embodiments, the first sheet has a tensile modulus of, for instance, 1200 MPa or greater, 1500 MPa or greater, or even 1700 MPa or greater. With increasing tensile modulus of the first sheet, the strength and size stability tend to improve in the first sheet as well as in the PSA sheet or laminate sheet that includes the first sheet. The maximum tensile modulus of the first sheet is not particularly limited. In some embodiments, from the standpoint of the handling properties (e.g. ease of winding) of the first sheet, the tensile modulus of the first sheet can be, for instance, 10000 MPa or less, 7000 MPa or less, 5500 MPa or less, 4500 MPa or less, 3500 MPa or less, or even 2800 MPa or less. The tensile modulus of the first sheet can be adjusted through its materials and production method.

In some embodiments, the second sheet has a tensile modulus of, for instance, 450 MPa or less, 350 MPa or less, 250 MPa or less, or even 200 MPa or less. With decreasing tensile modulus of the second sheet, wrinkling tends to be better inhibited. The minimum tensile modulus of the second sheet is not particularly limited. For instance, it can be 10 MPa or greater. In some embodiments, from the standpoint of the handling properties (e.g. strength and size stability) of the second sheet, the tensile modulus of the second sheet can be, for instance, 30 MPa or greater, 50 MPa or greater, or even 100 MPa or greater. The tensile modulus of the second sheet can be adjusted through its materials and production method.

In the laminate sheet disclosed herein, the first and second sheets have tensile moduli E1 and E2, respectively, wherein E1 is two times E2 or higher. In other words, the ratio (E1/E2) of tensile modulus E1 of the first sheet to tensile modulus E2 of the second sheet is 2 or higher. In some embodiments, the E1/E2 ratio can be, for instance, 3 or higher, 5 or higher, 7 or higher, 10 or higher, or even 13 or higher. With increasing E1/E2 ratio value, while wrinkling is inhibited, the strength and size stability of the laminate sheet tend to be enhanced. On the other hand, from the standpoint of better inhibiting wrinkling, in some embodiments, the E1/E2 ratio can be, for instance, 50 or lower, 30 or lower, or even 20 or lower.

As for each of the first and second sheets, a suitable species can be selected and used among various known sheets that satisfy the desired tensile modulus. Non-limiting examples of possible choices for the sheet include plastic films including a polyolefin film whose primary component is a polyolefin such as polypropylene and ethylene-propylene copolymer, a polyester film whose primary component is polyester such as polyethylene terephthalate and polybutylene terephthalate, and a polyvinyl chloride film whose primary component is polyvinyl chloride; a foam sheet formed of a foam such as polyurethane foam, polyethylene foam and polychloroprene foam; woven and nonwoven fabrics of single or blended spinning of various fibrous materials (which may be natural fibers such as hemp and cotton, synthetic fibers such as polyester and vinylon, semi-synthetic fibers such as acetate, etc.); paper such as Japanese paper, high-quality paper, kraft paper and crepe paper; and metal foil such as aluminum foil and copper foil. It can be a sheet formed of a composite of these materials. Non-limiting examples of the composite sheet include a sheet having a layered structure of metal foil and plastic film, and a plastic sheet reinforced with inorganic fibers such as glass cloth.

In some embodiments, as one or each of the first and second sheets, various kinds of resin film can be preferably used. The "resin film" here means a resin film that typically has a non-porous structure and is substantially free of air bubbles (void-less). Thus, the concept of resin film is distinct from such as the foam sheet and the non-woven fabric. The resin film may have a monolayer structure or a multilayer structure with two or more layers (e.g. a three-layer structure).

Examples of the resin material forming the resin film include resins such as polyester, polyolefin, nylon 6, nylon 66, polyamide (PA) including partially aromatic polyamide, polyimide (PI), polyamide-imide (PAI), polyether ether ketone (PEEK), polyether sulfone (PES), polyphenylene sulfide (PPS), polycarbonate (PC), polyurethane (PU), ethylene-vinyl acetate copolymer (EVA), fluororesins including polytetrafluoroethylene (PTFE), acrylic resins, polyarylate, polystyrene, polyvinyl chloride, and polyvinylidene chloride. The resin film may be formed from a resin material containing one species of such resin alone or a resin material in which two or more species are blended. The resin film may be non-stretched or stretched (e.g. uniaxially stretched or biaxially stretched).

Examples of the resin film that can be preferably used as the first sheet include polyester film and polyimide film.

The polyester film used here typically comprises polyester obtainable by condensation of a dicarboxylic acid and a diol as the primary component (i.e. a component accounting for more than 50% by weight). Specific examples of the polyester film include polyethylene terephthalate (PET) film, polybutylene terephthalate (PBT) film, polyethylene naphthalate (PEN) film, and polybutylene naphthalate film.

The polyimide film used here comprises, as the primary component, polyimide that has an imide bond in a repeat unit Examples of the resin film that can be preferably used as the second sheet include polyolefin film and polyurethane film.

As used herein, the polyolefin film refers to a film formed from a polyolefin resin having more than 50% polyolefin by weight. As the polyolefin resin, solely one species of polyolefin or a combination of two or more species of polyolefin can be used. Examples of the polyolefin include an α-olefin homopolymer, a copolymer of two or more species of α-olefin, and a copolymer of one, two or more species of α-olefin and another vinyl monomer. Specific examples include polyethylene (PE), polypropylene (PP), poly-1-butene, poly-4-methyl-1-pentene, ethylene-propylene copolymers such as ethylene-propylene rubber (EPR), ethylene-propylene-butene copolymers, ethylene-butene copolymers, ethylene-vinyl alcohol copolymers and ethylene-ethyl acrylate copolymers. Either a low-density (LD) polyolefin or a high-density (HD) polyolefin can be used. Examples of the polyolefin resin film include non-stretched polypropylene (CPP) film, biaxially-stretched polypropylene (OPP) film, low-density polyethylene (LDPE) film, linear low-density polyethylene (LLDPE) film, medium-density polyethylene (MDPE) film, high-density polyethylene (HDPE) film, polyethylene (PE) film in which two or more species of polyethylene (PE) are blended, PP/PE blend film in which polyethylene (PE) and polypropylene (PP) are blended.

The polyurethane film refers to a film formed from a polyurethane resin comprising more than 50% polyurethane by weight. The polyurethane can be any of ether-based polyurethane, ester-based polyurethane, carbonate-based polyurethane, etc. The polyurethane film may be formed from a polyurethane resin comprising two or more species of polyurethane at an arbitrary ratio.

While no particular limitations are imposed, favorable examples of a combination of the first and second sheets include a combination of a PE film comprising one, two or more species of polyethylene and a PET film; a combination of a PE/PP blend film and a PET film, a combination of a PE film comprising one, two or more species of polyethylene and a polyimide film; and a combination of a PE/PP blend film and a polyimide film.

As far as the effect of this invention is not significantly impaired, the resin film as described above may include, as necessary, known additives such as photo-stabilizing agent, antioxidant, anti-static agent, colorant (dye, pigment, etc.), filler, slip agent, and anti-blocking agent. The amounts of additives included are not particularly limited and can be suitably selected in accordance with the application of the PSA sheet or laminate sheet that comprises the resin film.

The method for producing the resin film is not particularly limited. For instance, heretofore known general resin film formation methods can be suitably employed, such as extrusion molding, inflation molding, T-die casting and calendar rolling.

The first and/or second sheet of the laminate sheet disclosed herein may be essentially formed of such resin film. Alternatively, they may include supplemental layers in addition to the resin film. Examples of the supplemental layers include an optical property-adjusting layer (e.g. a colored layer, an anti-reflective layer), a printed layer and a laminate layer to provide a desirable appearance, an antistatic layer, an undercoat layer, and a surface-modifying layer such as a release layer.

The thickness of each of the first and second sheet is not particularly limited. In view of the balance between strength and flexibility, it is normally preferable to use a sheet having a thickness in a range of about 5 µm to about 500 µm.

In some embodiments, the first sheet may have a thickness of, for instance, 5 µm or greater, 10 µm or greater, 25 µm or greater, or even 30 µm or greater. An increase in thickness of the first sheet tends to bring about greater strength and size stability of the first sheet as well as of the PSA sheet or laminate sheet that includes the first sheet. From the standpoint of the handling properties (e.g. ease of winding) of the first sheet, etc., the thickness of the first sheet can be, for instance, 200 µm or less, 150 µm or less, 100 µm or less, 70 µm or less, or even 50 µm or less. In the laminate sheet in an embodiment where the PSA layer is bonded to the first sheet, a decrease in thickness of the first sheet is also advantageous from the standpoint of reducing the thermal resistance value of the single-faced PSA sheet having the first sheet as the support substrate.

In some embodiments, the second sheet may have a thickness of, for instance, 10 µm or greater, 25 µm or greater, 45 µm or greater, 60 µm or greater, or even 75 µm or greater. An increase in thickness of the second sheet tends to improve the handling properties of the second sheet. From the standpoint of avoiding an unnecessary increase in total thickness of the laminate sheet, in some embodiments, the thickness of the second sheet can be, for instance, 500 µm or less, 300 µm or less, or even 200 µm or less. In the laminate sheet in an embodiment where the second sheet is bonded to the PSA layer, a decrease in thickness of the second sheet is also advantageous from the standpoint of reducing the thermal resistance value of the single-faced PSA sheet having the second sheet as the support substrate.

Of the first and second sheets, at least one has a release face on the side facing the PSA layer to be used as a release liner to protect the PSA layer. The release liner is not particularly limited. Examples that can be used include a release liner having a release layer on a surface of a liner substrate such as resin film and paper, and a release liner formed of a resin film formed from a low-adhesive material such as a fluoropolymer (polytetrafluoroethylene, etc.) and a polyolefinic resin (polyethylene, polypropylene, etc.). From the standpoint of the surface smoothness and the ease of adjusting the peel strength, in some embodiments, it is preferable to use a release liner having a release layer on a surface of an aforementioned resin film. The release layer can be formed, using a known release agent such as a silicone-based release agent, a long-chain alkyl-based release agent, an olefin-based release agent, a fluorine-based release agent, a fatty acid amide-based release agent, molybdenum sulfide and silica powder. It is particularly preferable to use a silicone-based release agent. The thickness of the release layer is not particularly limited; it is generally suitably about 0.01 µm to 1 µm or preferably about 0.1 µm to 1 µm. The release liner may be subjected to antistatic treatment as necessary, by means of coating, kneading, vapor deposition, etc. In the laminate sheet wherein both the first and second sheets are release liners, their constitutions (materials, thicknesses, types of release agents used, etc.) and peel strength values to the PSA layer can be the same or different.

The peel strength of the release liner forming the laminate sheet disclosed herein relative to the PSA layer is not particularly limited. It can be prescribed so that the release liner can be properly peeled off the PSA layer. The peel strength is usually suitably 3.0 N/50 mm or less, preferably 2.0 N/50 mm or less, or more preferably 1.5 N/20 mm or less. From the standpoint of facilitating the peeling operation, in some embodiments, the peel strength can be, for instance, 1.0 N/50 mm or less, 0.7 N/50 mm or less, 0.5 N/20 mm or less, or even 0.3 N/50 mm or less. The minimum peel strength is not particularly limited. From the standpoint of favorably obtaining protection of the adhesive face, it is usually suitably 0.01 N/50 mm or greater, 0.05 N/50 mm or greater, 0.08 N/50 mm or greater, or even 0.1 N/50 mm or greater.

The peel strength (N/50 mm) is determined by using a 50 mm wide strip of the laminate sheet as the measurement sample; and, in an environment at 23° C. and 50% RH, peeling the release liner of interest at a tensile speed of 0.3 m/min at a peel angle of 180°, using a universal tensile tester. The peel strength can be adjusted through the constitution (e.g. the material of the liner substrate) of the release liner, the type of release agent used, the thickness of the release layer and conditions for its formation, the composition of the PSA layer, and so on. When it is difficult to use a 50 mm wide strip of measurement sample, the peel strength obtained by using a measurement sample of a different width can be converted to the value per 50 mm-width.

In the laminate sheet disclosed herein, one of the first and second sheets can also be a support substrate to which the PSA layer is bonded. The support substrate can be subjected, as necessary, on the side facing the PSA layer, to heretofore known surface treatment such as corona discharge treatment, plasma treatment, UV irradiation, acid treatment, base treatment, and undercoating (primer coating). Such surface treatment may enhance the tightness of adhesion between the support substrate and the PSA layer, that is, the anchoring of the PSA layer to the support substrate. The composition of the primer is not particularly limited and can be suitably selected among known species. The thickness of the primer layer is not particularly limited and is usually suitably about 0.01 μm to 1 μm, or preferably about 0.1 μm to 1 μm.

<PSA Layer>

In the laminate sheet disclosed herein, the PSA forming the PSA layer is not particularly limited. The PSA may comprise, as the base polymer (i.e. a component accounting for 50% by weight or more of polymers), one, two or more species among various polymers showing rubber elasticity in a room temperature range, with examples including acrylic polymers, rubber-based polymers, polyester-based polymers, urethane-based polymers, polyether-based polymers, silicone-based polymers, polyamide-based polymers, and fluorine-containing polymer. The PSA layer in the art disclosed herein may be formed from a PSA composition comprising such a base polymer. The form of PSA composition is not particularly limited. For instance, it can be in various forms including a water dispersion, solvent-based, hot-melt type, and active energy ray curable (e.g. photocurable).

As used herein, the term "active energy ray" refers to an energy ray having energy capable of causing a chemical reaction such as polymerization, crosslinking, initiator decomposition, etc. Examples of the active energy ray herein include lights such as ultraviolet (UV) rays, visible light, infrared light, radioactive rays such as α rays, β rays, γ rays, electron beam, neutron radiation, and X rays.

(Base Polymer)

The base polymer has a glass transition temperature (Tg) preferably below 0° C., more preferably below −10° C., or possibly below −20° C. A PSA comprising a base polymer with such a Tg is suited for forming a PSA layer that conforms well to contours. In some embodiments, the base polymer's Tg can be, for instance, below −30° C., below −40° C., below −50° C., or even below −60° C. The minimum Tg value of the base polymer is not particularly limited. From the standpoint of the material availability and greater cohesion of the PSA layer, it is usually favorable to use a base polymer having a Tg of −80° C. or higher.

Here, the Tg of the base polymer refers to a nominal value given in a reference book, catalog, etc., or a Tg value determined by the Fox equation based on the composition of monomers used for preparation of the base polymer. As shown below, the Fox equation is a relational expression between the Tg of a copolymer and glass transition temperatures Tgi of homopolymers obtainable by homopolymerization of the respective monomers constituting the copolymer.

$$1/Tg = \Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i. When the base polymer is a homopolymer, the homopolymer's Tg equals to the base polymer's Tg.

As for the glass transition temperatures of homopolymers used for Tg determination, values listed in a known document are used. In particular, values are given in "Polymer Handbook" (3rd edition, John Wiley & Sons, Inc., Year 1989). With respect to a monomer for which several values are given in Polymer Handbook, the highest value is used. For glass transition temperatures of homopolymers whose corresponding monomers are not listed in Polymer Handbook, values obtained by the measurement method described in Japanese Patent Application Publication No. 2007-51271 can be used.

While no particular limitations are imposed, the weight average molecular weight (Mw) of the base polymer can be, for instance, about $5 \times 10^4$ or higher. With a base polymer having such a Mw, a PSA that shows good cohesion is likely to be obtained. In some embodiments, the base polymer's Mw can be, for instance, $10 \times 10^4$ or higher, $20 \times 10^4$ or higher, or even $30 \times 10^4$ or higher. The base polymer's Mw is usually suitably about $500 \times 10^4$ or lower. The base polymer with such a Mw is suited for forming a PSA layer that conforms well to contours.

The Mw of the base polymer can be determined as a value based on standard polystyrene by gel permeation chromatography (GPC). The GPC analysis can be carried out, using, for instance, a GPC system HLC-8220GPC available from Tosoh Corporation under the conditions shown below.

[GPC Analysis]

Sample concentration: 0.2% by weight (tetrahydrofuran (THF) solution)
Sample injection: 10 μL
Eluent: THF, flow rate: 0.6 mL/minute
Measurement temperature: 40° C.
Columns:
Sample columns; 1 TSK guardcolumn SuperHZ-H+2 TSKgel SuperHZM-H columns
Reference column; 1 TSKgel SuperH-RC column
Detector: differential refractometer (RI)

The laminate sheet disclosed herein can be favorably made, for instance, in an embodiment having a PSA layer formed of a PSA that comprises an acrylic polymer as the base polymer.

As used herein, the term "acrylic polymer" refers to a polymer having a monomeric unit derived from a (meth)acrylic monomer in the polymer structure and typically refers to a polymer containing over 50% by weight monomeric units derived from a (meth)acrylic monomer. The term "(meth)acrylic monomer" refers to a monomer having at least one (meth)acryloyl group in one molecule. In this context, it is intended that the term "(meth)acryloyl group" collectively refers to an acryloyl group and a methacryloyl group. Therefore, the concept of "(meth)acrylic monomer" as used herein may encompass both an acrylic monomer having an acryloyl group and a methacrylic monomer having a methacryloyl group. Similarly, it is intended that the term "(meth)acrylic acid" as used herein collectively refers to acrylic acid and methacrylic acid and the term "(meth) acrylate" collectively refers to an acrylate and a methacrylate.

The acrylic polymer can be a polymer containing at least 50% by weight monomeric unit derived from an alkyl (meth)acrylate, that is, a polymer in which an alkyl (meth) acrylate accounts for 50% by weight or more of the total amount of monomers used for preparing the acrylic polymer. A preferable alkyl (meth)acrylate has a linear or branched alkyl group with 1 to 20 carbons (i.e. $C_{1-20}$). For easy balancing of properties, of the total amount of monomers, the ratio of $C_{1-20}$ alkyl (meth)acrylate can be, for instance, 50% by weight or higher, preferably 60% by weight or higher, or more preferably 70% by weight or higher. For the same reason, of the total amount of monomers, the ratio of $C_{1-20}$ alkyl (meth)acrylate can be, for instance, 99.9% by weight or less, preferably 98% by weight or less, or more preferably 95% by weight or less. In some embodiments, of the total amount of monomers, the ratio of $C_{1-20}$ alkyl (meth)acrylate can be, for instance, 90% by weight or less, or even 85% by weight or less.

Non-limiting specific examples of the $C_{1-20}$ alkyl (meth)acrylate include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, nonadecyl (meth)acrylate, and eicosyl (meth)acrylate.

Among these, it is preferable to use at least a $C_{1-18}$ alkyl (meth)acrylate and it is more preferable to use at least a $C_{1-14}$ alkyl (meth)acrylate. In some embodiments, the acrylic polymer may include, as a monomeric unit, at least one species selected among $C_{4-12}$ alkyl (meth)acrylates (preferably $C_{4-10}$ alkyl acrylates such as an $C_{6-10}$ alkyl acrylates). For example, the acrylic polymer preferably includes one or each of n-butyl acrylate (BA) and 2-ethylhexyl acrylate (2EHA), and the acrylic polymer particularly preferably includes at least 2EHA. Examples of other $C_{1-18}$ alkyl (meth)acrylates that are preferably used include methyl acrylate, methyl methacrylate (MMA), n-butyl methacrylate (BMA), 2-ethylhexyl methacrylate (2EHMA), and isostearyl acrylate (ISTA).

In addition to the alkyl (meth)acrylate as the primary component, the monomers forming the acrylic polymer may include, as necessary, another monomer (copolymerizable monomer) that is able to copolymerize with the alkyl (meth)acrylate. As the copolymerizable monomer, a monomer having a polar group (such as a carboxy group, a hydroxy group and an amide group) may be suitably used. The monomer having a polar group may be useful for introducing a cross-linking point into the acrylic polymer or increasing cohesive strength of the acrylic polymer. For the copolymerizable monomer, solely one species or a combination of two or more species can be used.

Non-limiting specific examples of the copolymerizable monomer include those indicated below.

Carboxyl group-containing monomers: for example, acrylic acid, methacrylic acid, carboxyethyl acrylate, carboxypentyl acrylate, itaconic acid, maleic acid, fumaric acid, crotonic acid and isocrotonic acid;

Acid anhydride group-containing monomers: for example, maleic anhydride and itaconic anhydride;

Hydroxy group-containing monomers: for example, hydroxyalkyl (meth)acrylates such as 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate and (4-hydroxymethylcyclohexyl)methyl (meth)acrylate;

Monomers having a sulphonate group or a phosphate group: for example, styrene sulphonic acid, allyl sulphonic acid, sodium vinylsulphonate, 2-(meth)acrylamide-2-methylpropane sulphonic acid, (meth)acrylamide propane sulphonic acid, sulphopropyl (meth)acrylate, (meth)acryloyloxy naphthalenesulphonic acid and 2-hydroxyethylacryloyl phosphate;

Epoxy group-containing monomers: for example, epoxy group-containing acrylates such as glycidyl (meth)acrylate and (meth)acrylate-2-ethyl glycidyl ether, allyl glycidyl ether and (meth)acrylate glycidyl ether;

Cyano group-containing monomers: for example, acrylonitrile and methacrylonitrile;

Isocyanato group-containing monomers: for example, 2-isocyanatoethyl (meth)acrylate;

Amido group-containing monomers: for example, (meth)acrylamide; N,N-dialkyl (meth)acrylamides such as N,N-dimethyl(meth)acrylamide, N,N-diethyl(meth)acrylamide, N,N-dipropyl(meth)acrylamide, N,N-diIsopropyl(meth)acrylamide, N,N-di(n-butyl)(meth)acrylamide and N,N-di(t-butyl) (meth)acrylamide; N-alkyl (meth)acrylamides such as N-ethyl(meth)acrylamide, N-isopropyllmeth)acrylamide, N-butyl(meth)acrylamide and N-n-butyl(meth)acrylamide; N-vinylcarboxylic acid amides such as N-vinylacetamide; a monomer having a hydroxy group and an amide group, for example, an N-hydroxyalkyl(meth)acrylamide such as N-(2-hydroxyethyl)(meth)acrylamide, N-(2-hydroxypropyl)(meth)acrylamide, N-(1-hydroxypropyl)(meth)acrylamide, N-(3-hydroxypropyl)(meth)acrylamide, N-(2-hydroxybutyl)(meth)acrylamide, N-(3-hydroxybutyl)(meth)acrylamide, and N-(4-hydroxybutyl)(meth)acrylamide; a monomer having an alkoxy group and an amide group, for example, an N-alkoxyalkyl(meth)acrylamide such as N-methoxymethyl (meth)acrylamide, N-methoxyethyl(meth)acrylamide, and N-butoxymethyl(meth)acrylamide; and N,N-dimethylaminopropyl(meth)acrylamide, N-(meth)acryloylmorpholine, etc.

Monomers having a nitrogen atom-containing ring: for example, N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinylmorpholine, N-vinyl-3-morpholinone, N-vinyl-2-caprolactam, N-vinyl-1,3-oxazin-2-one, N-vinyl-3,5-morpholinedione, N-vinylpyrazole, N-vinylisoxazole, N-vinylthiazole, N-vinylisothiazole and N-vinylpyridazine (such as lactams including N-vinyl-2-caprolactam);

Monomers having a succinimide skeleton: for example, N-(meth)acryloyloxy methylene succinimide, N-(meth)acryloyl-6-oxy hexamethylene succinimide and N-(meth)acryloyl-8-oxy hexamethylene succinimide;

Maleimides: for example, N-cyclohexylmaleimide, N-isopropylmaleimide, N-laurylmaleimide and N-phenylmaleimide;

Itaconimides: for example, N-methyl itaconimide, N-ethyl itaconimide, N-butyl itaconimide, N-octyl itaconimide, N-2-ethylhexyl itaconimide, N-cyclohexyl itaconimide and N-lauryl itaconimide;

Aminoalkyl (meth)acrylates: for example, aminoethyl (meth)acrylate, N,N-dimethylaminoethyl (meth)acrylate, N,N-diethylaminoethyl (meth)acrylate and t-butylaminoethyl (meth)acrylate;

Alkoxy group-containing monomers: for example, an alkoxyalkyl (meth)acrylate such as 2-methoxyethyl (meth)acrylate, 3-methoxypropyl (meth)acrylate, 2-ethoxyethyl (meth)acrylate, propoxyethyl (meth)acrylate, butoxyethyl (meth)acrylate and ethoxypropyl (meth)acrylate; and an alkoxy alkylene glycol (meth)acrylate such as methoxy ethylene glycol (meth)acrylate, methoxy propylene glycol (meth)acrylate, methoxy poly(ethylene glycol) (meth)acrylate and methoxy poly(propylene glycol) (meth)acrylate;

Vinyl esters: for example, vinyl acetate and vinyl propionate;

Vinyl ethers: for example, vinyl alkyl ethers such as methyl vinyl ether and ethyl vinyl ether;

Aromatic vinyl compounds: for example, styrene, α-methylstyrene and vinyl toluene;

Olefins: for example, ethylene, butadiene, isoprene and isobutylene;

(Meth)acrylic esters having an alicyclic hydrocarbon group: for example, cyclopentyl (meth)acrylate, cyclohexyl (meth)acrylate, isobornyl (meth)acrylate and dicyclopentanyl (meth)acrylate;

(Meth)acrylic esters having an aromatic hydrocarbon group: for example, phenyl (meth)acrylate, phenoxyethyl (meth)acrylate and benzyl (meth)acrylate;

Heterocyclic ring-containing (meth)acrylates such as tetrahydrofurfuryl (meth)acrylate, halogen atom-containing monomers such as vinyl chloride and halogen atom-containing (meth)acrylates (for example, fluorine atom-containing (meth)acrylates), silicon atom-containing (meth)acrylates such as silicone (meth)acrylate, (meth)acrylic esters obtained from terpene compound derivative alcohols, and the like.

Copolymerizable monomers that can be preferably used in some embodiments include hydroxyalkyl acrylates such as 2-hydroxyethyl acrylate and 4-hydroxybutyl acrylate, N-hydroxyalkylacrylamides such as N-(2-hydroxyethyl) acrylamide, N-vinyl cyclic amides such as N-vinyl-2-pyrrolidone, and alkoxyalkyl acrylates such as methoxyethyl acrylate. Among these, solely one species or a combination of two or more species can be used.

When using a copolymerizable monomer as described above, its amount used is not particularly limited, but it is usually suitably at least 0.01% by weight of the total amount of monomers. From the standpoint of obtaining greater effect of the use of the copolymerizable monomer, the amount of copolymerizable monomer used can be 0.1% by weight or more of the total amount of monomers, or even 1% by weight or more. The amount of copolymerizable monomer used can be 50% by weight or less of the total amount of monomers, or preferably 40% by weight or less. This can prevent the PSA from gaining excessively high cohesive strength, bringing about greater contour-conformability.

The method for obtaining the acrylic polymer is not particularly limited. Various polymerization methods known as synthetic methods of acrylic polymers may be appropriately employed such as solution polymerization, emulsion polymerization, bulk polymerization, suspension polymerization and photopolymerization. In some embodiments, solution polymerization or photopolymerization may be preferably employed.

The initiator used for polymerization may be appropriately selected according to the polymerization method from heretofore known thermal polymerization initiators, photopolymerization initiators and the like. For the polymerization initiator, solely one species or a combination of two or more species can be used.

Examples of the thermal polymerization initiator include azo polymerization initiators, persulfates, peroxide polymerization initiators and redox polymerization initiators. The amount of thermal polymerization initiator used is not particularly limited, and may be, for example, in the range of 0.01 part by weight to 5 parts by weight and preferably 0.05 part by weight to 3 parts by weight relative to 100 parts by weight of monomers used for preparing the acrylic polymer.

The photopolymerization initiator is not particularly limited and examples thereof that may be used include benzoin ether photopolymerization initiators, acetophenone photopolymerization initiators, α-ketol photopolymerization initiators, aromatic sulphonyl chloride photopolymerization initiators, photoactive oxime photopolymerization initiators, benzoin photopolymerization initiators, benzyl photopolymerization initiators, benzophenone photopolymerization initiators, ketal photopolymerization initiators, thioxanthone photopolymerization initiators, acylphosphine oxide photopolymerization initiators and the like. The amount of photopolymerization initiator used is not particularly limited, and may be, for example, in the range of 0.01 part by weight to 5 parts by weight and preferably 0.05 part by weight to 3 parts by weight relative to 100 parts by weight of monomers used for preparing the acrylic polymer.

In some embodiments, the PSA composition for forming PSA layers may include the acrylic polymer as a partial polymer (acrylic polymer syrup) obtainable by subjecting a mixture of monomers with a polymerization initiator to UV irradiation to polymerize part of the monomers. The PSA composition containing such acrylic polymer syrup is applied to a certain substrate and irradiated with UV to complete the polymerization. In other words, the acrylic polymer syrup can be thought as a precursor of the acrylic polymer. The PSA layer disclosed herein can be formed, using, for instance, a PSA composition that includes the acrylic polymer as the base polymer in the acrylic polymer syrup form and includes, as necessary, a suitable amount of a polyfunctional monomer described later.

(Siloxane Structure-Containing Polymer)

The PSA layer may include, as necessary, a component other than the base polymer (e.g. acrylic polymer). One favorable example of the optional component is a siloxane structure-containing polymer. The siloxane structure-containing polymer is defined as a polymer having a siloxane structure (Si—O—Si structure) in the molecule. As the siloxane structure-containing polymer, a polymer having a siloxane structure in a side chain can be preferably used.

The siloxane structure-containing polymer included in the PSA layer may be useful in providing or improving adhesive strength rise-retarding properties. The adhesive strength rise-retarding properties refer to properties that cause a large increase in adhesive strength when a suitable adhesive strength-increasing stimulus is applied with respect to the initial adhesive strength observed for a while in a room temperature range (e.g. 20° C. to 30° C.) after applied to an adherend. The adhesive strength-increasing stimulus can be intentional or unintentional application of heat, aging, a combination of these, etc. Hereinafter, the ratio of increased adhesive strength to initial adhesive strength may be referred to as the "adhesive strength rise ratio." It can be thought that, with the mobility and low polarity of the siloxane structure, the siloxane structure-containing polymer may serve as an adhesive strength rise retarder that contributes to a decrease in initial adhesive strength and an increase in adhesive strength rise ratio.

The siloxane structure-containing polymer (or abbreviated to a "polymer Ps" hereinafter) preferably includes a monomer having a polyorganosiloxane skeleton (or a "monomer S1" hereinafter) as a monomeric unit. The monomer S1 is not particularly limited and an arbitrary monomer containing a polyorganosiloxane skeleton can be used. Due to the low polarity attributed to its structure, such a polyorganosiloxane skeleton-containing monomer facilitates concentration of the polymer Ps in the PSA layer surface in the laminate sheet prior to use, thereby exhibiting light release (low adhesiveness) initially upon application.

As the monomer S1, for instance, a compound represented by the general formula (1) or (2) below can be used.

More specific examples include mono-terminally reactive silicone oils X-22-174ASX, X-22-2426, X-22-2475 and KF-2012 available from Shin-Etsu Chemical Co., Ltd. For the monomer S1, solely one species or a combination of two or more species can be used.

[Chem 1]

(1)

[Chem 2]

(2)

In general formulas (1) and (2), $R^3$ is a hydrogen or a methyl group; $R^4$ is a methyl group or a monovalent organic group; and m and n are integers of 0 or higher.

The functional group equivalent weight of monomer S1 is not particularly limited. From the standpoint of facilitating the sufficient reduction of the initial adhesive strength, it can be, for instance, preferably 700 g/mol or greater, more preferably 800 g/mol or greater, yet more preferably 850 g/mol or greater, or particularly preferably 1500 g/mol or greater. The functional group equivalent weight of monomer S1 can be, for instance, 50000 g/mol or less. From the standpoint of facilitating the sufficient adhesive strength rise, it can be, for instance, preferably 30000 g/mol or less, more preferably 20000 g/mol or less. In some embodiments, the functional group equivalent weight of monomer S1 can be, for instance, preferably less than 18000 g/mol, less than 15000 g/mol, less than 10000 g/mol, less than 6000 g/mol, or less than 5000 g/mol. Non-limiting examples of preferable ranges for the functional group equivalent weight of monomer S1 include, 700 g/mol or greater and 50000 g/mol or less, 700 g/mol or greater and 30000 g/mol or less, 700 g/mol or greater and 20000 g/mol or less, 700 g/mol or greater and less than 18000 g/mol, 700 g/mol or greater and less than 15000 g/mol, 800 g/mol or greater and less than 10000 g/mol, 850 g/mol or greater and less than 6000 g/mol, and 1500 g/mol or greater and less than 5000 g/mol. When the functional group equivalent weight of monomer S1 is in the aforementioned ranges, it is easy to adjust the compatibility (e.g. compatibility with the base polymer) and mobility within the PSA layer in suitable ranges and obtain a PSA layer that combines initial low adhesion and in-use strong adhesion at a high level.

Here, the "functional group equivalent weight" means the weight of main skeleton (e.g. polydimethylsiloxane) bonded to one functional group. For the unit g/mol, the value is converted to per 1 mol of functional groups. The functional group equivalent weight of monomer S1 can be determined from spectrum intensities of $^1$H-NMR (proton NMR) based on nuclear magnetic resonance (NMR). The functional group equivalent weight (g/mol) of monomer S1 based on $^1$H-NMR spectrum intensities can be determined based on a general structural analysis method about $^1$H-NMR spectrum analysis, if necessary, with reference to the teaching of Japanese Patent No. 5951153.

When two or more different monomers varying in functional group equivalent weight are used as the monomer S1, their arithmetic average value can be used as the functional group equivalent weight of monomer S1. In other words, the functional group equivalent weight (eq. wt.) of monomer S1 consisting of n number of different monomers (monomers $S1_1, S1_2 \ldots S1_n$) with varied functional group equivalent weights can be determined by the equation shown below.

Monomer S1's functional group eq. wt. (g/mol)=(functional group eq. wt. of monomer $S1_1$×amount of monomer $S1_1$+functional group eq. wt. of monomer $S1_2$×amount of monomer $S1_2$+ . . . +functional group eq. wt. of monomer $S1_n$×amount of monomer $S1_n$)/(amount of monomer $S1_1$+ amount of monomer $S1_2$+ . . . +amount of monomer $S1_n$)

Relative to all monomers used for preparing the polymer Ps, the monomer S1 content can be, for instance, 5% by weight or greater. From the standpoint of obtaining greater effect as the adhesive strength rise retarder, it is preferably 10% by weight or greater, or possibly 15% by weight or greater. From the standpoint of the polymerization reactivity and compatibility, relative to all monomers used for preparing the polymer Ps, the monomer S1 content is suitably 60% by weight or less; it can be 50% by weight or less, 40% by weight or less, or even 30% by weight or less.

In addition to the monomer S1, the monomeric units forming the polymer Ps may include, as necessary, a (meth)acrylic monomer copolymerizable with the monomer S1 or other copolymerizable monomer(s). For instance, by copolymerizing one, two or more species of (meth)acrylic monomers and the monomer S1, the compatibility between the polymer Ps and the base polymer (e.g. acrylic polymer) can be favorably adjusted.

An example of the (meth)acrylic monomer is an alkyl (meth)acrylate. For instance, one, two or more species exemplified earlier as the alkyl (meth)acrylates that may be used for the acrylic polymer can be used. In some embodiments, the polymer Ps may include, as the monomeric unit, at least one species of $C_{4-12}$ alkyl (meth)acrylate (preferably $C_{4-10}$ alkyl (meth)acrylate, e.g. $C_{6-10}$ alkyl (meth)acrylate). In some other embodiments, the polymer Ps may include, as the monomeric unit, at least one species of $C_{1-18}$ alkyl methacrylate (preferably $C_{1-14}$ alkyl methacrylate, e.g. $C_{1-10}$ alkyl methacrylate). The monomeric units forming the polymer Ps may include one, two or more species selected among, for instance, MMA, BMA and 2EHMA.

Other examples of the (meth)acrylic monomer include a (meth)acrylate having an alicyclic hydrocarbon group. For example, cyclopentyl (meth)acrylate, cyclohexyl (meth)acrylate, isobornyl (meth)acrylate, dicyclopentanyl (meth)acrylate, 1-adamantyl (meth)acrylate or the like may be used. In some embodiments, the polymer Ps may contain as a monomeric unit at least one species selected from dicyclopentanyl methacrylate, isobornyl methacrylate and cyclohexyl methacrylate.

The amount of (meth)acrylate and the alicyclic hydrocarbon group-containing (meth)acrylate used may be, for example, 10% by weight or more and 95% by weight or less, 20% by weight or more and 95% by weight or less, 30% by weight or more and 90% by weight or less, 40% by weight or more and 90% by weight or less or 50% by weight or more and 85% by weight or less relative to all monomers used for preparing the polymer Ps.

Other examples of the monomer that may be included as a monomeric unit forming the polymer Ps in addition to the monomer S1 include aforementioned carboxyl group-containing monomers, acid anhydride group-containing monomers, hydroxy group-containing monomers, epoxy group-containing monomers, cyano group-containing monomers, isocyanato group-containing monomers, amido group-containing monomers, monomers having nitrogen atom-containing rings, monomers having succinimide skeletons, maleimides, itaconimides, aminoalkyl (meth)acrylates, vinyl esters, vinyl ethers, olefins, (meth)acrylic esters having aromatic hydrocarbon groups, heterocyclic ring-containing (meth)acrylates, halogen atom-containing (meth)acrylates, and (meth)acrylates obtained from terpene compound derivative alcohols, which are exemplified earlier as monomers that may be used for the acrylic polymer.

Other examples of the monomer that may be included as a monomeric unit forming the polymer Ps in addition to the monomer S1 include oxyalkylene di(meth)acrylates such as ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate and tripropylene glycol di(meth)acrylate; polymerizable polyoxyalkylene ethers which have, at one terminal of the polyoxyalkylene chain having a polyoxyalkylene skeleton such as polyethylene glycol and polypropylene glycol, a polymerizable functional group such as a (meth)acryloyl group, a vinyl group and an allyl and, at the other terminal, an ether structure (such as alkyl ether, aryl ether and aryl alkyl ether); alkoxyalkyl (meth)acrylates such as methoxyethyl (meth)acrylate, ethoxyethyl (meth)acrylate, propoxyethyl (meth)acrylate, butoxyethyl (meth)acrylate and ethoxypropyl (meth)acrylate; salts such as alkali metal (meth)acrylates; polyvalent (meth)acrylates such as trimethylolpropane tri(meth)acrylic ester: halogenated vinyl compounds such as vinylidene chloride and 2-chloroethyl (meth)acrylate; oxazoline group-containing monomers such as 2-vinyl-2-oxazoline, 2-vinyl-5-methyl-2-oxazoline and 2-isopropenyl-2-oxazoline; aziridine group-containing monomers such as (meth)acryloyl aziridine and 2-aziridinylethyl (meth)acrylate; hydroxy group-containing vinyl monomers such as 2-hydroxyethyl (meth)acrylate, 2-hydroxypropyl (meth)acrylate and addicts of a lactone and 2-hydroxyethyl (meth)acrylate; fluorine-containing vinyl monomers such as fluorine-substituted (meth)acrylic acid alkyl esters; reactive halogen-containing vinyl monomers such as 2-chloroethyl vinyl ether and vinyl monochloroacetate; organic silicon-containing vinyl monomers such as vinyltrimethoxysilane, γ-(meth)acryloxypropyl trimethoxysilane, allyltrimethoxysilane, trimethoxysilylpropylallylamine and 2-methoxyethoxytrimethoxysilane; and macromonomers having a radical polymerizable vinyl group at a monomer terminal obtained by polymerization of vinyl groups. Among these, solely one species or a combination of two or more species can be copolymerized with the monomer S1.

The Mw of polymer Ps is not particularly limited. The polymer Ps's Mw can be, for instance, $0.7 \times 10^4$ or greater and $50 \times 10^4$ or less. In some embodiments, it can be $0.7 \times 10^4$ or greater and $35 \times 10^4$ or less, or $0.7 \times 10^4$ or greater and less than $10 \times 10^4$. When the polymer Ps's Mw is within this range, it is easy to adjust the compatibility and mobility within the PSA layer in suitable ranges and obtain a PSA layer that combines initial low adhesion and in-use strong adhesion at a high level. In some embodiments, the polymer Ps's Mw can be, for instance, $1 \times 10^4$ or greater, $1.2 \times 10^4$ or greater, $1.5 \times 10^4$ or greater, and $1.7 \times 10^4$ or greater. In some embodiments, the polymer Ps's Mw can be, for instance, less than $5 \times 10^4$, less than $4 \times 10^4$, or even less than $3 \times 10^4$.

The polymer Ps can be prepared by polymerizing the aforementioned monomers by a known method such as solution polymerization, emulsion polymerization, bulk polymerization, suspension polymerization and photopolymerization.

To adjust the molecular weight of the polymer Ps, a chain transfer agent can be used. Examples of the chain transfer agent used include mercapto group-containing compounds such as octyl mercaptan, lauryl mercaptan, t-nonyl mercaptan, t-dodecyl mercaptan, mercaptoethanol and α-thioglycerol; thioglycolic acid, and thioglycolic esters such as methyl thioglycolate, ethyl thioglycolate, propyl thioglycolate, butyl thioglycolate, t-butyl thioglycolate, 2-ethylhexyl thioglycolate, octyl thioglycolate, isooctyl thioglycolate, decyl thioglycolate, dodecyl thioglycolate, thioglycolic ester of ethylene glycol, thioglycolic ester of neopentyl glycol and thioglycolic ester of pentaerythritol; and α-methylstyrene dimer.

The amount of chain transfer agent used is not particularly limited. Relative to 100 parts by weight of monomers, it usually includes 0.05 part to 20 parts by weight of chain transfer agent, preferably 0.1 part to 15 parts by weight, or more preferably 0.2 part to 10 parts by weight. Such adjustment of the amount of chain transfer agent added can bring about a polymer Ps having a favorable molecular weight. For the chain transfer agent, solely one species or a combination of two or more species can be used.

While no particular limitations are imposed, the amount of polymer Ps used to 100 parts by weight of base polymer (e.g. acrylic polymer) can be, for instance, 0.1 part by weight or more; from the standpoint of obtaining greater effect, it can be 0.3 part by weight or more, 0.4 part by weight or more, or even 0.5 part by weight or more. With increasing amount of polymer Ps used, greater effect tends to be obtained in reducing the initial adhesive strength or increasing the adhesive strength rise ratio, or in both of these. In some embodiments, the amount of polymer Ps used to 100 parts by weight of base polymer can be 1 part by weight or more, 2 parts by weight or more, or even 3 parts by weight or more. The art disclosed herein can be favorably implemented in an embodiment where the amount of polymer Ps used to 100 parts by weight of base polymer is more than 5 parts by weight, more than 10 parts by weight, more than 12 parts by weight, or more than 15 parts by weight. The amount of polymer Ps used to 100 parts by weight of base polymer can be, for instance, 75 parts by weight or less, 60 parts by weight or less, or even 50 parts by weight or less. From the standpoint of avoiding an excessive decrease in cohesive strength of the PSA layer, in some embodiments, the amount of polymer Ps used to 100 parts by weight of base polymer can be, for instance, 40 parts by weight or less, 35 parts by weight or less, 30 parts by weight or less, or even 25 parts by weight or less. From the standpoint of obtaining higher post-heat adhesive strength, in some embodiments, the amount of polymer Ps used can be 20 parts by weight or less, 17 parts by weight or less, 15 parts by weight or less, or even 10 parts by weight or less. In some embodiments, the amount of polymer Ps used to 100 parts by weight of base polymer can be, for instance, less than 10 parts by weight, or even 8 parts by weight or less.

The polymer Ps-containing PSA layer may have an adhesive strength N1 at 30 minutes of standing at 23° C. after applied to a stainless steel plate and an adhesive strength N2 at 23° C. after subjected to 5 minutes of heating at 80° C. after applied to a stainless steel plate, wherein N2 is at least two times N1. In other words, the adhesive strength rise ratio (N2/N1) can be 2 or greater. From the standpoint of combining initial low adhesion and in-use strong adhesion at a higher level, in some embodiments, the adhesive strength rise ratio (N2/N1) can be, for instance, 2.5 or higher, or even 3.5 or higher. The maximum adhesive strength rise ratio (N2/N1) is not particularly limited. From the standpoint of the ease of manufacturing and cost-effectiveness, it can be, for instance, 100 or lower, 80 or lower, 50 or lower, 30 or lower, 20 or lower, or even 15 or lower. For instance, the laminate sheet according to some embodiments may include a PSA layer having an adhesive strength rise ratio (N2/N1) of 2 or higher and 20 or lower, or 2 or higher and 15 or lower.

The adhesive strength rise ratio (N2/N1) is defined as the initial adhesive strength (N/20 mm) to post-heat adhesive strength (N/20 mm) ratio. The initial adhesive strength is obtained by press-bonding the PSA sheet to a stainless steel (SUS) plate as the adherend, leaving the resultant standing in an environment at 23° C. and 50% RH for 30 minutes, and measuring the 180° peel strength at a peel angle of 180° at a tensile speed of 300 mm/min. The post-heat adhesive strength (N/20 mm) is obtained by press-bonding the PSA sheet to a SUS plate as the adherend, heating the resultant at 80° C. for 5 minutes, leaving it standing in an environment at 23° C. and 50% RH for 30 minutes, and measuring the 180° peel strength at a peel angle of 180° at a tensile speed of 300 mm/min under the environment. As the adherend, a SUS304 BA plate is used for initial adhesive strength as well as for post-heat adhesive strength.

(Crosslinking Agent)

In the PSA layer, for purposes such as adjusting the cohesive strength, a crosslinking agent may be used as necessary. As the crosslinking agent, a crosslinking agent known in the PSA field can be used, with examples including epoxy-based crosslinking agents, isocyanate-based crosslinking agent, silicone-based crosslinking agent, oxazoline-based crosslinking agent, aziridine-based crosslinking agent, silane-based crosslinking agent, alkyl-etherified melamine-based crosslinking agent and metal chelate-based crosslinking agents. In particular, isocyanate-based crosslinking agents, epoxy-based crosslinking agents and metal chelate-based crosslinking agents can be favorably used. For the crosslinking agent, solely one species or a combination of two or more species can be used.

When using a crosslinking agent, its amount used is not particularly limited. For instance, its amount can be greater than 0 part by weight relative to 100 parts by weight of base polymer. The amount of crosslinking agent used to 100 parts by weight of base polymer can be, for instance, 0.01 part by weight or greater, or preferably 0.05 part by weight or greater. With increasing amount of crosslinking agent used, greater cohesive strength tends to be obtained. In some embodiments, the amount of crosslinking agent used to 100 parts by weight of base polymer can be 0.1 part by weight or greater, 0.5 part by weight or greater, or even 1 part by weight or greater. On the other hand, from the standpoint of avoiding degradation of contour-conformability caused by an excessive increase in cohesive strength, the amount of crosslinking agent used to 100 parts by weight of base polymer is usually suitably 15 parts by weight or less, 10 parts by weight or less, or even 5 parts by weight or less. The art disclosed herein can also be favorably implemented in an embodiment using no crosslinking agent.

To allow an aforementioned crosslinking reaction to proceed effectively, a crosslinking catalyst may be used. As the crosslinking catalyst, for instance, a tin-based catalyst (especially, dioctyltin dilaurate) can be preferably used. The amount of crosslinking catalyst used is not particularly limited. For instance, it can be about 0.0001 part to 1 part by weight to 100 parts by weight of base polymer.

In the PSA layer, a polyfunctional monomer may be used as necessary. The polyfunctional monomer used in place of or in combination with a crosslinking agent as described above may be helpful for purposes such as adjusting the cohesive strength. For instance, in the PSA layer formed from a photo-curable PSA composition, a polyfunctional monomer can be preferably used.

Examples of the polyfunctional monomer include ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, pentaerythritol tri(meth)acrylate, dipentaerythritol hexa(meth)acrylate, ethyleneglycol di(meth)acrylate, 1,6-hexanediol di(meth)acrylate, 1,12-dodecanediol di(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethane acrylate, butyldiol (meth)acrylate and hexyldiol di(meth)acrylate. Among them, trimethylolpropane tri(meth)acrylate, 1,6-hexanediol di(meth)acrylate and dipentaerythritol hexa(meth)acrylate can be favorably used. For the polyfunctional monomer, solely one species or a combination of two or more species can be used.

The amount of polyfunctional monomer used depends on its molecular weight, the number of functional groups therein, etc.; it is usually suitably in a range of about 0.01 part to 3 parts by weight to 100 parts by weight of base polymer. In some embodiments, the amount of polyfunctional monomer used to 100 parts by weight of base polymer can be, for instance, 0.02 part by weight or greater, or even 0.03 part by weight or greater. With increasing amount of polyfunctional monomer used, a higher cohesive strength tends to be obtained. On the other hand, from the standpoint of avoiding degradation of contour-conformability caused by an excessive increase in cohesive strength, the amount of polyfunctional monomer used to 100 parts by weight of base polymer can be 2.0 parts by weight or less, 1.0 part by weight or less, or even 0.5 part by weight or less.

(Tackifier Resin)

The PSA layer may include a tackifier resin as necessary. The tackifier resin is not particularly limited. Examples include a rosin-based tackifier resin, a terpene-based tackifier resin, a phenol-based tackifier resin, a hydrocarbon-based tackifier resin, a ketone-based tackifier resin, a polyamide-based tackifier resin, an epoxy-based tackifier resin, and an elastomer-based tackifier resin. For the tackifier resin, solely one species or a combination of two or more species can be used.

A preferable tackifier resin has a softening point (softening temperature) of about 80° C. or higher (preferably about 100° C. or higher, e.g. about 120° C. or higher). The maximum softening point is not particularly limited; it can be, for instance, about 200° C. or lower (typically 180° C. or lower). The softening point of a tackifier resin can be determined based on the softening point test method (ring and ball method) specified in JIS K 2207.

When using a tackifier resin, its amount included is not particularly limited and can be selected so that suitable adhesive properties are obtained in accordance with the purpose and application. The tackifier resin content (when two or more species of tackifier resins are included, their combined amount) to 100 parts by weight of base polymer can be, for instance, 5 parts by weight or greater, or even 10 parts by weight or greater. On the other hand, from the standpoint of enhancing the contour-conformability, in some embodiments, the tackifier resin content to 100 parts by weight of base polymer is suitably 100 parts by weight or less; it can be 50 parts by weight or less, or even 25 parts by weight or less. Alternatively, a tackifier resin may not be used.

(Filler)

The PSA layer may include a filler as necessary. The filler is not particularly limited. For instance, a particulate or fibrous filler can be used. For the filler, solely one species or a combination of two or more species can be used.

The material forming the filler can be an inorganic material, with examples including metals such as copper, silver, gold, platinum, nickel, aluminum, chromium, iron, and stainless steel; metal oxides such as aluminum oxide, silicon oxides (typically silicon dioxide), titanium oxide, zirconium oxide, zinc oxide, tin oxide, antimonic acid-doped tin oxide, copper oxide, and nickel oxide; hydrated metal compounds such as aluminum hydroxide [$Al_2O_3.3H_2O$ or $Al(OH)_3$], boehmite [$Al_2O_3 \cdot H_2O$ or $AlOOH$], magnesium hydroxide [$MgO.H_2O$ or $Mg(OH)_2$], calcium hydroxide [$CaO.H_2O$ or $Ca(OH)_2$], zinc hydroxide [$Zn(OH)_2$], silica [$H_4SiO_4$ or $H_2SiO_3$ or $H_2Si_2O_5$], iron hydroxide [$Fe_2O_3.H_2O$ or $2FeO(OH)$], copper hydroxide [$Cu(OH)_2$], barium hydroxide [$BaO.H_2O$ or $BaO.9H_2O$], hydrated zirconium oxide [$ZrO.nH_2O$], hydrated tin oxide [$SnO.H_2O$], basic magnesium carbonate [$3MgCO_3.Mg(OH)_2.3H_2O$], hydrotalcite [$6MgO.Al_2O_3.H_2O$]dawsonite [$Na_2CO_3-Al_2O_3.nH_2O$], borax [$Na_2O.B_2O_5.5H_2O$] and zinc borate [$2ZnO.3B_2O_5.3.5H_2O$]; carbides such as silicon carbide, boron carbide, nitrogen carbide, and calcium carbide; nitrides such as aluminum nitride, silicon nitride, boron nitride, and gallium nitride; carbonates such as calcium carbonate; titanates including barium titanate and potassium titanate; carbon-based substances including carbon black, carbon tubes (typically carbon nanotubes), carbon fibers, and diamond; and glass; and polymers such as polystyrene, acrylic resin (e.g. polymethyl methacrylate), phenol resin, benzoguanamine resin, urea resin, silicone resin, polyester, polyurethane, polyethylene, polypropylene, polyamide (e.g. nylon, etc.), polyimide, and polyvinylidene chloride. Alternatively, particulate natural raw materials can also be used, such as volcanic shirasu (ash), clay and sand. As the fibrous filler, various synthetic fibers and natural fibers can be used.

In typical, a particulate filler is preferably used because it is less likely to impair the smoothness of the adhesive face even if it is included in the PSA layer in a relatively large amount. The particle shape is not particularly limited; it may have a bulky shape, a needle-like shape, a flaky shape, or a layered shape. Examples of the bulky shape include a globular shape, a cuboid shape, a granular shape and deformed shapes of these. The particle structure is not particularly limited. For instance, it may have a compact structure, a porous structure, a hollow structure, etc.

When using a photocurable (e.g. UV curable) PSA composition, from the standpoint of the photo curing ability (polymerization reactivity) of the PSA composition, it is preferable to use a filler formed of an inorganic material. The filler formed of an inorganic material can be preferably used as a thermally conductive filler that contributes to an increase in thermal conductivity of the PSA layer. Favorable examples of the thermally conductive filler include fillers having dense structures formed from metal hydrates, metal oxides, metals, etc.

In some embodiments, fillers formed of aforementioned hydrated metal compounds can be preferably used. The hydrated metal compounds generally start to decompose at temperatures between 150° C. and 500° C.; they are compounds represented by the general formula $MxOy.nH_2O$ (M is a metal atom, x and y are integers of 1 or greater determined by the valence of the metal, and n is the number of waters of hydration) or double salts containing these compounds. A favorable example of the hydrated metal compound is aluminum hydroxide.

Hydrated metal compounds are commercially available. Examples of commercially available aluminum hydroxides include product names HIGILITE H-100-ME (mean primary particle diameter: 75 μm), HIGILITE H-10 (mean primary particle diameter: 55 μm), HIGILITE H-32 (mean primary particle diameter: 8 μm), HIGILITE H-31 (mean primary particle diameter: 20 μm) and HIGILITE H-42 (mean primary particle diameter: 1 μm) (all available from Showa Denko K.K.); and product name B103ST (mean primary particle diameter: 8 μm) (available from Nippon Light Metal Co., Ltd.). Examples of commercially available magnesium hydroxide include product name KISUMA 5A (mean primary particle diameter: 1 μm) (available from Kyowa Chemical Industry Co., Ltd.).

Examples of commercially available fillers other than hydrated metal compounds include boron nitride under product names HP-40 (available from Mizushima Ferroalloy Co., Ltd.) and P1620 (available from Momentive Performance Materials Inc); aluminum oxide under product names AS-50 and AS-10 (available from Showa Denko K.K.); antimonic acid-doped tin under product names SN-100S, SN-100P and SN-100D (an aqueous dispersion) (all available from Ishihara Sangyo Kaisha, Ltd.); titanium oxide products under the TTO series (available from Ishihara Sangyo Kaisha, Ltd.); and zinc oxide under product names ZnO-310, ZnO-350 and ZnO-410 (available from Sumitomo Osaka Cement Co., Ltd.).

The filler content in the PSA layer is not particularly limited and can be selected in accordance with the purpose (e.g. desired thermal conductivity, etc.). Of the PSA layer, the filler content can be, for instance, 5% by weight or more, 10% by weight or more, 25% by weight or more, 33% by weight or more, 40% by weight or more, or even 50% by weight or more. With increasing filler content, the thermal conductivity of the PSA layer tends to increase. In some embodiments, the filler content can be 55% by weight or more of the PSA layer, 60% by weight or more, or even 65% by weight or more. From the standpoint of preventing deterioration of surface smoothness of the PSA layer so that tight adhesion is likely to be achieved with the adherend, the filler content is usually suitably 90% by weight or less, preferably 85% by weight or less, or possibly 80% by weight or less, or even 75% by weight or less.

The mean particle diameter of filler is not particularly limited. The mean particle diameter is usually suitably 100 μm or less, preferably 50 μm or less, or possibly even 20 μm or less. With decreasing mean particle diameter, the surface of the PSA layer tends to be smoother, leading to tighter adhesion to the adherend. In some embodiments, the filler may have a mean particle diameter of 10 μm or less, 5 μm or less, or even 3 μm or less. The filler's mean particle diameter can be, for instance, 0.1 μm or greater, 0.2 μm or greater, or even 0.5 μm or greater. It can be advantageous to have not too small a mean particle diameter from the standpoint of the ease of handling and dispersing the filler.

In some embodiments, relative to the thickness Ta of the PSA layer, the filler's mean particle diameter is preferably less than 0.5 Ta. Here, in this description, unless otherwise informed, the filler's mean particle diameter refers to the 50th-percentile particle diameter (median diameter) corresponding to 50% cumulative weight in a given size distribution obtained by a screening analysis. When the filler's mean particle diameter is less than 50% of the PSA layer's thickness Ta, it can be said that 50% by weight or more of the filler in the PSA layer have particle diameters smaller than the PSA layer's thickness Ta. When 50% by weight or more of the filler in the PSA layer have particle diameters smaller than the PSA layer's thickness Ta, there is a higher tendency for the surface (adhesive face) of the PSA layer to maintain good surface conditions (e.g. smoothness). This is preferable from the standpoint of obtaining tighter adhesion to the adherend to increase the thermal conductivity.

The laminate sheet disclosed herein can be preferably made in an embodiment where, in the particle distribution obtained by the scanning analysis, 60% by weight or more of the filler in the PSA layer have particle diameters smaller than the PSA layer's thickness Ta (more preferably than 0.7 Ta, or yet more preferably than 0.5 Ta). Of the filler, the ratio of particles having particle diameters smaller than the PSA layer's thickness Ta (more preferably than 0.7 Ta, or yet more preferably than 0.5 Ta) can be, for instance, 70% by weight or more, 80% by weight or more, or even 90% by weight or more. It is more preferable that substantially all of the filler in the PSA layer have particle diameters smaller than the PSA layer's thickness Ta (more preferably than 0.7 Ta, or yet more preferably than 0.5 Ta). Here, "substantially all" typically means 99% by weight or more and 100% by weight or less, for instance, 99.5% by weight or more and 100% by weight or less.

In some embodiments of the laminate sheet disclosed herein, the PSA layer may comprise, as the filler, a first filler having a first size distribution and a second filler having a second size distribution. In the first filler's size distribution (first size distribution), the first filler has a mean primary particle diameter (by volume) of preferably less than 10 µm, more preferably 5 µm or less, or yet more preferably 2 µm or less. The mean primary particle diameter (by volume) of the first filler may be, for instance, 0.1 µm or greater. In the second filler's size distribution (second size distribution), the second filler has a mean primary particle diameter (by volume) of preferably 10 µm or greater, more preferably 20 µm or greater, or yet more preferably 30 µm or greater. The mean primary particle diameter (by volume) of the second filler may be, for instance, 100 µm or less. Here, the size distributions are determined by laser scattering particle size distribution analysis. In particular, they are determined by a laser scattering size meter. The mean primary particle diameter by volume is determined as a D50 (50th-percentile or median diameter) value based on the size distribution data.

In an embodiment using the first and second fillers as the filler, the weight ratio of the first filler to the second filler in the PSA layer (first filler/second filler) can be, for instance, 10/90 to 80/20, 20/80 to 70/30, or even 30/70 to 60/40.

(Dispersing Agent)

The PSA composition for forming PSA layers may comprise, as necessary, a dispersing agent to well disperse the filler in the PSA composition. The PSA composition with a well dispersed filler can form a PSA layer with good adhesive properties.

As the dispersing agent, a known surfactant can be used. The surfactant encompasses nonionic, anionic, cationic and amphoteric surfactants. For the dispersing agent, solely one species or a combination of two or more species can be used.

One example of preferable dispersing agent is a phosphoric acid ester. For instance, a monoester, diester, triester of phosphoric acid, a mixture of these and the like can be used. Specific examples of the phosphoric acid ester include phosphoric acid monoesters of polyoxyethylene alkyl ether, polyoxyethylene alkyl aryl ether or polyoxyethylene aryl ether, the corresponding phosphoric acid diesters, the corresponding phosphoric acid triesters, and derivatives of these. Favorable examples include phosphoric acid monoesters of polyoxyethylene alkyl ether or polyoxyethylene alkyl aryl ether, and phosphoric acid diesters of polyoxyethylene alkyl ether or polyoxyethylene alkyl aryl ether. The number of carbon atoms of the alkyl group in such a phosphoric acid ester is, for instance, 6 to 20, preferably 8 to 20, or more preferably 10 to 18, typically 12 to 16.

As the phosphoric acid ester, a commercially available product can be used. Examples include trade names PLYSURF A212E, PLYSURF A210G, PLYSURF A212C and PLYSURF A215C available from DKS Co., Ltd., and trade names PHOSPHANOL RE610, PHOSPHANOL RS710 and PHOSPHANOL RS610 available from TOHO Chemical Industry Co., Ltd.

The amount of dispersing agent used to 100 parts by weight of filler can be, for instance, 0.01 part to 25 parts by weight; it is usually suitably 0.1 part to 25 parts by weight. From the standpoint of preventing troubled application of the PSA composition and roughening of the adhesive face caused by poor dispersion of the filler, the amount of dispersing agent used to 100 parts by weight of filler is preferably 0.5 part by weight or greater, more preferably 1 part by weight or greater, yet more preferably 2 parts by weight or greater, or even 5 parts by weight or greater. From the standpoint of avoiding deterioration of adhesive properties caused by an excessive use of dispersing agent, the amount of dispersing agent used to 100 parts by weight of filler is preferably 20 parts by weight or less, more preferably 15 parts by weight or less, possibly 12 parts by weight or less, or even 10 parts by weight or less.

Besides the above, as far as the effect of this invention is not significantly impaired, the PSA layer in the art disclosed herein may include, as necessary, known additives that can be used in PSA, such as leveling agent, plasticizer, softener, colorant (dye, pigment, etc.), antistatic agent, anti-aging agent, UV absorber, antioxidant, photo stabilizer, and preservative.

(Formation of PSA Layer)

The PSA layer forming the laminate sheet disclosed herein may be a cured layer of the PSA composition. In other words, it can be formed by providing (e.g. applying) the PSA composition to a suitable surface and then subjecting it to a suitable curing process. When two or more different curing processes (drying, crosslinking, polymerization, etc.) are carried out, these can be done at the same time or in stages. When a partial polymer (e.g. acrylic polymer syrup) of monomers are used for the PSA composition, a final copolymerization reaction is typically carried out as the curing process. That is, the partial polymer is subjected to a further copolymerization reaction to form a fully polymerized product. For instance, with respect to a photocurable PSA composition, photoirradiation is carried out. As necessary, curing processes such as crosslinking and drying can be performed. For instance, with respect to a photocurable PSA composition that needs to be dried, photocuring should be carried out after drying. With respect to a PSA composition using a fully polymerized product, processes such as drying (drying with heat) and crosslinking are typically carried out as necessary as the curing process.

The PSA composition can be applied with, for example, a conventional coater such as a gravure roll coater, a reverse roll coater, a kiss-roll coater, a dip roll coater, a bar coater, a knife coater and a spray coater.

The laminate sheet disclosed herein includes a PSA layer having a thickness of 200 μm or greater. According to such a thick PSA layer or a PSA sheet in which the PSA layer is bonded to a support substrate, good contour-conformability (which can be considered as contour-absorbing properties as well) can be obtained. From the standpoint of further enhancing the contour-conformability, in some embodiments, the thickness of the PSA layer can be, for instance, 250 μm or greater, 300 μm or greater, or even 350 μm or greater. From the standpoint of the ease of processing and of preventing the PSA layer from oozing out, the thickness of the PSA layer is usually suitably 1000 μm or less, or preferably 800 μm or less; it can also be 600 μm or less, or even 500 μm or less. A thinner PSA layer can also be advantageous in view of reducing the thermal resistance value of the PSA layer or a PSA sheet having the PSA layer bonded to a support substrate.

In some embodiments, the PSA layer may be formed of a PSA composition of a solvent-free type. Here, the solvent-free type refers to a PSA composition whose solvent content is 5% by weight or lower, typically 1% by weight or lower. The solvent refers to a component that is not included in the final PSA layer. Thus, for instance, unreacted monomers and the like possibly present in acrylic polymer syrup are excluded from the concept of solvent. A solvent-free PSA composition is suited for forming a thick PSA layer because it does not necessarily require a drying step after applied. As the solvent-free PSA composition, for instance, a photo-curable or hot-melt PSA composition can be used. In particular, a preferable PSA layer is formed from a photo-curable (e.g. UV-curable) PSA composition. Formation of a PSA layer using a photo-curable PSA composition is often carried out in an embodiment where curing is conducted by subjecting the PSA composition air-tightly enclosed between two sheets to photoirradiation. Thus, with respect to the laminate sheet having a PSA layer formed from a photo-curable PSA composition, it is particularly meaningful to have a structure unsusceptible to wrinkling even when wound.

(Properties of PSA Layer)

The storage modulus of the PSA layer is not particularly limited. It can be, for instance, about 0.01 MPa to 1.0 MPa. The storage modulus can be, for instance, 0.9 MPa or less, or even 0.8 MPa or less. With decreasing storage modulus of the PSA layer, the contour-conformability of the PSA layer tends to increase. The storage modulus can be, for instance, 0.05 MPa or greater, or even 0.08 MPa or greater. An increase in storage modulus of the PSA layer tends to improve the ease of processing and inhibit the PSA from oozing out as well.

According to the art disclosed herein, the occurrence of wrinkling can be favorably inhibited even in the laminate sheet that comprises a PSA layer having a storage modulus of 0.1 MPa or greater while having a thickness of 200 μm or greater. Accordingly, in some embodiments, the storage modulus of the PSA layer can be, for instance, 0.1 MPa or greater, 0.3 MPa or greater, greater than 0.4 MPa, or even greater than 0.5 MPa, for instance, 0.55 MPa or greater. These storage moduli can be preferably applied to, for instance, a PSA layer comprising a filler. The storage modulus of the PSA layer can be adjusted through the base polymer's Tg, use of crosslinking agent and a polyfunctional monomer, use of tackifier resin, etc.

The storage modulus of a PSA layer can be determined by dynamic viscoelasticity analysis. In particular, several layers of PSA of interest are suitably layered to form a laminate (laminated PSA layer) of about 1.5 mm in thickness. This is punched out into a disc of 7.9 mm diameter to obtain a measurement sample. The measurement sample is fastened between parallel plates and analyzed by a rheometer to determine the storage modulus at 23° C. As the rheometer, ARES available from TA Instruments or a comparable product can be used. The same measurement method is employed in the working examples described later.

[Storage Modulus Analysis]

Measurement mode: shear mode
Temperature range: −20° C. to 100° C.
Heating rate: 5° C./min
Measurement frequency: 1 Hz <Laminate Sheet>

The form of the laminate sheet disclosed herein is not particularly limited. For instance, it can be in a roll or in a flat sheet. The laminate sheet may have a width of, for instance, 5 mm or greater, preferably 30 mm or greater, 50 mm or greater, 150 mm or greater, 300 mm or greater, or even 500 mm or greater. With increasing width of the laminate sheet, the laminate sheet tends to be more susceptible to wrinkling caused by its winding. Thus, it is particularly meaningful to apply the art disclosed herein to inhibit wrinkling. When the PSA layer has a smaller width than that of the laminate sheet, the maximum and minimum width values of the laminate sheet can be applied to the maximum and minimum width values of the PSA layer.

The total thickness of the laminate sheet disclosed herein is greater than 200 μm. From the standpoint of the ease of manufacturing, etc., it is usually suitably 225 μm or greater. Here, the total thickness of the laminate sheet refers to the thickness from the outer face of the first sheet to the outer face of the second sheet. The outer faces of the first and second sheets refer to the surfaces on the reverse sides of the faces facing the PSA layer. In some embodiments, the total thickness of the laminate sheet can be, for instance, 250 μm or greater, 300 μm or greater, 350 μm or greater, 450 μm or greater, or even 500 μm or greater. According to the art disclosed herein, wrinkling can be effectively inhibited even in a laminate sheet having such as large total thickness. The maximum total thickness of the laminate sheet is not particularly limited. It is usually suitably 2000 μm or less, or it can be 1500 μm or less, or even 1000 μm or less.

<Roll>

The present description provides a roll comprising a laminate sheet disclosed herein in a wound form. A typical example of the roll includes a roll comprising a core (roll core) and a laminate sheet wound around the core. The shape of the core is not particularly limited. For instance, it may have a solid cylindrical shape, a hollow cylindrical shape (i.e. a tubular shape), a hollow or solid polygonal shape, etc. From the standpoint of facilitating the handling of the roll, a hollow cylindrical core or a hollow polygonal core can be preferably used. A cylindrical core is particularly preferable.

The material forming the core is not particularly limited and a known material can be used. Examples include paper such as cardboard; plastic materials such as PE resin, PP resin, vinyl chloride resin, polyester, epoxy resin, phenol resin, melamine resin, silicon resin, polyurethane, polycarbonate, and acrylonitrile-butadiene-styrene copolymer resin (ABS resin); composite materials such as fiber-reinforced plastic (FRP); and metal materials such as iron, stainless steel (SUS) and aluminum.

The core's outer diameter is not particularly limited. In some embodiments, the core may have an outer diameter of, for instance, 30 mm or greater, 50 mm or greater, 70 mm or greater, 80 mm or greater, or even 85 mm or greater. With increasing outer diameter of the core, wrinkling tends to be more easily inhibited. On the other hand, in order to increase the productivity, etc., it is normally desirable to make the laminate sheet longer so as to reduce the frequency the rolls need to be replaced. To include a longer laminate sheet in the roll, it is advantageous that the core has a smaller outer diameter. From such a standpoint, for instance, the core's outer diameter is preferably 300 mm or less, or it can be 250 mm or less, 200 mm or less, or even 180 mm or less. The art disclosed herein can be favorably implemented even in an embodiment of the roll having a core's outer diameter of 150 mm or less, 100 mm or less, or even 95 mm or less. Even in such an embodiment, wrinkling can be significantly inhibited. When the roll core has a non-circular cross-sectional shape, the diameter of the core refers to the diameter of a circle approximating the cross-sectional shape.

In case of a hollow core, the wall thickness of the core is not particularly limited. It can be suitably selected so as to obtain desirable strength, considering the material and outer diameter of the core, etc. From the standpoint of reducing the weight of the roll, etc., the wall thickness of the core is usually suitably about 2 mm to 15 mm, or preferably about 3 mm to 10 mm.

<Applications>

The laminate sheet disclosed herein has a thick PSA layer; and therefore, it is highly conformable to surface structures of an adherend. For instance, even on an adherend having contours such as a rough or uneven surface or on an adherend susceptible to deformation such as deflection and distortion, it is likely to absorb the contours and deformation by means of deformation of the PSA layer, thereby achieving tight adhesion between the adherend and the PSA layer. This can be advantageous in view of improving the heat transfer between the adherend and the PSA layer, improving the bonding of the PSA layer to the adherend, and so on.

With these features, the laminate sheet disclosed herein may be preferably used in an embodiment, for example, in which the PSA layer (possibly a PSA layer bonded to a support substrate) in the laminate sheet is adhered to components of various portable devices for purposes such as fixing, connecting, heat radiating, heat transferring, shaping, decorating, protecting, and supporting the components. Here, being portable means not just providing simple mobility, but further providing a level of portability that allows an individual (average adult) to carry it relatively easily. Examples of the portable devices referred to herein include portable electronic devices such as mobile phones, smartphones, tablet PCs, notebook PCs, various wearable devices, digital cameras, digital video cameras, acoustic equipment (portable music players, IC recorders, etc.), computing devices (calculators, etc.), portable game devices, electronic dictionaries, electronic notebooks, electronic books, automotive information systems, portable radios, portable televisions, portable printers, portable scanners and portable modems as well as mechanical wristwatches and pocket watches, flashlights and hand mirrors. Examples of components of portable electronic devices may include optical films and display panels used in image display units such as liquid crystal displays and organic EL displays. The PSA layer and the laminate sheet including the PSA layer used for heat radiation and heat transfer can be considered as thermally conductive sheets.

EXAMPLES

Several working examples related to the present invention are described below, but these specific examples are not to limit the present invention. In the description below, '%' is by weight unless otherwise specified.

Preparation of Laminate Sheet

Example 1

As a support substrate S1, was used a 38 µm thick transparent PET film (LUMIRROR S10 available from Toray Industries, Inc.; tensile modulus 2200 MPa). To the PET film, was applied a UV-curable acrylic PSA composition C1 containing approximately 70% filler. This was covered with release liner L0 (a 75 µm thick transparent PET film treated with a silicone-based release agent on one face) to block the air. The PSA composition C1 was cured by UV irradiation to form a 200 µm thick PSA layer having a storage modulus of 0.6 MPa. Subsequently, release liner L0 was removed from the PSA layer. To the exposed PSA layer, was newly adhered a release liner L1 (a 100 µm thick white-colored PE film treated with a silicone-based release agent on one face). In other words, release liner (process liner) L0 covering the adhesive face was replaced with release liner (product liner) L1. A laminate sheet was thus prepared, having a structure in which support substrate S1, the PSA layer and release liner L1 were laminated in this order. As the filler, were used, at a 1:1 weight ratio, HIGILITE H-42 (aluminum hydroxide powder, mean particle diameter (by volume) 1 µm, maximum particle diameter (by volume)<10 µm, granular form) and HIGILITE H-10 (aluminum hydroxide powder, mean particle diameter (by volume) 55 µm, minimum particle diameter (by volume)≥10 µm, granular form) both available from Showa Denko K.K.

Example 2

The amount of the PSA composition C1 applied was adjusted to form a 400 µm thick PSA layer. Otherwise in the same manner as Example 1, was prepared a laminate sheet according to this Example.

Example 3

In place of the PSA composition C1 in Example 2, was used a UV-curable acrylic PSA composition C2 having the same composition as the PSA composition C1, but without the filler. Otherwise in the same manner as Example 2, was prepared a laminate sheet according to this Example.

Example 4

In place of release liner L1, was used a 150 µm thick blue-colored polyolefin film (release liner L2) having a laminate structure formed of a PP layer as a core layer and a PE layer as a release layer. Otherwise in the same manner as Example 2, was prepared a laminate sheet according to this Example.

Example 5

Release liner L0 was not replaced with release liner L1 after the PSA layer was formed. Otherwise in the same manner as Example 1, was prepared a laminate sheet according to this Example.

Example 6

Release liner L0 was not replaced with release liner L1 after the PSA layer was formed. Otherwise in the same manner as Example 3, was prepared a laminate sheet according to this Example.

<Winding Test>

In each Example above, were used 230 mm wide, long pieces of support substrate and release liner and the PSA composition was applied to the central portion of the width of the support substrate, covering a width of about 200 mm, to prepare the laminate sheet. The lengthwise edges of the laminate sheet according to each Example were cut on the inside of the width of the PSA layer formed from the PSA composition to prepare a winding test sample of 150 mm in width and about 20 m in length.

A tubular core having an outer diameter of 90.2 mm, an inner diameter of 76.2 mm and an axial length of 150 mm was obtained. With respect to each winding test sample, with the support substrate side on the inside, one end of the length of the sample was fixed to the outer circumferential surface of the core with commercial PSA tape and the remaining portion was wound around the core at a winding tension of about 100 N/m to prepare a roll. The other end of the length of the sample (the end of the roll) was fixed to the inner-circumferentially located outer face of the sample (outer face of the release liner) with commercial PSA tape. After the roll was stored in a room at 40° C. for 24 hours, the roll edges (i.e. the axial end surfaces of the roll) were visually inspected to check the occurrence of wrinkling. In particular, when gaps were observed by the visual inspection of the roll edges, wrinkling was judged as "Present"; when no gaps were observed, wrinkling was judged as "Absent." The results are shown in Table 1. Table 1 also shows the tensile moduli of the release liners and support substrate as well as the storage moduli of the PSA layers determined by the methods described earlier.

TABLE 1

| | | Ex. 1 | Ex. 2 | Ex. 3 | Ex. 4 | Ex. 5 | Ex. 6 |
|---|---|---|---|---|---|---|---|
| Release liner | Material | PE | PE | PE | PE/PP | PET | PET |
| | Tensile modulus (MPa) | 130 | 130 | 130 | 300 | 2200 | 2200 |
| | Thickness (μm) | 100 | 100 | 100 | 150 | 75 | 75 |
| PSA layer | Storage modulus (MPa) | 0.6 | 0.6 | 0.1 | 0.6 | 0.6 | 0.1 |
| | Thickness (μm) | 200 | 400 | 400 | 400 | 200 | 400 |
| Support substrate | Material | PET | PET | PET | PET | PET | PET |
| | Tensile modulus (MPa) | 2200 | 2200 | 2200 | 2200 | 2200 | 2200 |
| | Thickness (μm) | 38 | 38 | 38 | 38 | 38 | 38 |
| Evaluation | Wrinkling | Absent | Absent | Absent | Absent | Present | Present |

As shown in Table 1, with respect to the laminate sheets of Examples 1 to 4 each using a support substrate (first sheet) having a tensile modulus of 1000 MPa or greater and a release liner (second sheet) having a tensile modulus of 500 MPa or less together, despite of having a PSA layer as thick as or thicker than 200 μm, no wrinkling was observed even when wound in a roll.

On the other hand, with respect to the laminate sheets of Examples 5 and 6 in which, between the support substrate and the release liner, one had a tensile modulus of 1000 MPa or greater and the other had a tensile modulus greater than 500 MPa, wrinkling was clearly observed in the rolls formed under the same conditions as Examples 1 to 4.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

10 PSA sheet
12 support substrate (first sheet)
14 PSA layer
14A adhesive face
20 release liner (second sheet)
30 laminate sheet
50 roll
52 core
60 PSA sheet
60A first adhesive face
60B second adhesive face
62 PSA layer
71 first release liner (first sheet)
72 second release liner (second sheet)
80 laminate sheet

What is claimed is:

1. A roll comprising a laminate sheet having a first sheet, a pressure-sensitive adhesive layer and a second sheet laminated in this order, wherein
one of the first and second sheets is a release liner having a release face on the side facing the pressure-sensitive adhesive layer, and the other is a support substrate to which the pressure-sensitive adhesive layer is bonded,
an outer surface of the first sheet is in contact with an outer surface of the second sheet,
the pressure-sensitive adhesive layer has a thickness of 200 μm or greater,
the pressure-sensitive adhesive layer comprises a filler in an amount of more than 40% by weight and 90% by weight or less,
the first sheet has a tensile modulus of 1000 MPa or greater,
the second sheet has a tensile modulus of 500 MPa or less, and
the pressure-sensitive adhesive layer has a storage modulus of 0.1 MPa or greater at 23° C.

2. The roll according to claim 1, wherein the first sheet is formed of a film selected from the group consisting of polyethylene terephthalate film, polyethylene naphthalate film and polyimide film.

3. The roll according to claim 1, wherein the second sheet is formed of polyolefin film.

4. The roll according to claim 1, wherein the first sheet is the support substrate and the second sheet is the release liner.

5. The roll according to claim 1, wherein the wound laminate sheet has an inner diameter of 100 mm or less.

6. The roll according to claim 1, wherein the laminate sheet is wound with the first sheet side being the inner circumferential side.

* * * * *